United States Patent [19]

Anderton

[11] Patent Number: 4,602,845
[45] Date of Patent: Jul. 29, 1986

[54] OPTICAL FIBER CONNECTOR
[75] Inventor: John J. Anderton, Oil City, Pa.
[73] Assignee: GTE Products Corporation, Stamford, Conn.
[21] Appl. No.: 703,448
[22] Filed: Feb. 19, 1985

Related U.S. Application Data
[63] Continuation of Ser. No. 396,522, Jul. 8, 1982, abandoned.
[51] Int. Cl.[4] ............................ G02B 6/36; G02B 6/41
[52] U.S. Cl. ................................ 350/96.20; 350/96.21
[58] Field of Search ........................... 350/96.20, 96.21

[56] References Cited
U.S. PATENT DOCUMENTS
4,050,781 9/1977 Beauhaire ..................... 350/96.21

Primary Examiner—William L. Sikes
Assistant Examiner—Akm E. Ullah
Attorney, Agent, or Firm—Robert E. Walter

[57] ABSTRACT

A connector which forms an optical fiber to a fiber receiving member along a straight axis includes a slidable member having a camming means for holding the fiber when the fiber is moved toward the receiving member to complete an optical connection.

1 Claim, 2 Drawing Figures

OPTICAL FIBER CONNECTOR

This application is a continuation of application Ser. No. 06/396,522, filed July 8, 1982 and now abandoned.

BACKGROUND OF THE INVENTION

This invention relates generally to optical fibers and more specifically to a connector therefor.

There are many advantages to transmitting light energy via optical fiber wave guides and the use thereof is diverse. Single or multiple fiber wave guides may be used simply for transmitting light to a remote location. Complex communication systems may transmit multiple specific optical signals. These devices often require the coupling of fibers in end-to-end relationship. The coupling is a source of light loss with axial misalignment representing a particularly serious problem. Other factors causing signal loss are angular misalignment of fibers, longitudinal separation of fiber ends and reflection or refraction at the fiber ends.

When placing optical fibers in end-to-end relationship to minimize light loss, it is desirable to have a rugged splice that can be simply and reliably used in field installations. The junctioned fibers should be protected from environmental factors and be securely held in place.

The following patents relate to various fiber optic connectors: U.S. Pat. No. 3,922,064 to Clark et al, U.S. Pat. No. 3,990,779 to McCartney, U.S. Pat. No. 4,050,783 to Tardy, U.S. Pat. No. 4,050,781 to Beauhairi, U.S. Pat. No. 4,097,129 to Wellington et al, and U.S. Pat. No. 4,146,299 to Wellington et al.

SUMMARY OF THE INVENTION

It is desirable to form an optical fiber connector of simple construction that can be easily assembled and provides an accurate interconnection between optical fibers.

According to the present invention, there is provided a connector for joining an optical fiber to a fiber receiving member for the transmission of optical signals comprising an elongated housing including means adapted to secure a fiber stationary with respect to said housing, means for holding said receiving member for receiving a fiber along a straight axis, and a channel intermediate said fiber securing means and said holding means, a member slidably associated with said channel includes a passageway to permit the passage of a fiber therethrough in alignment with said straight axis for receipt thereof by said receiving member, said member includes an abutting surface adjacent said straight axis and camming means adapted to urge a fiber against said abutting surface from a position permitting fiber movement to a position fixedly securing said fiber to said slidable member whereby said fiber is adapted to be received by said receiving member for transmission of optical signals when said slidable member is moved toward said receiving member.

DETAILED DESCRIPTION

Figure 1:
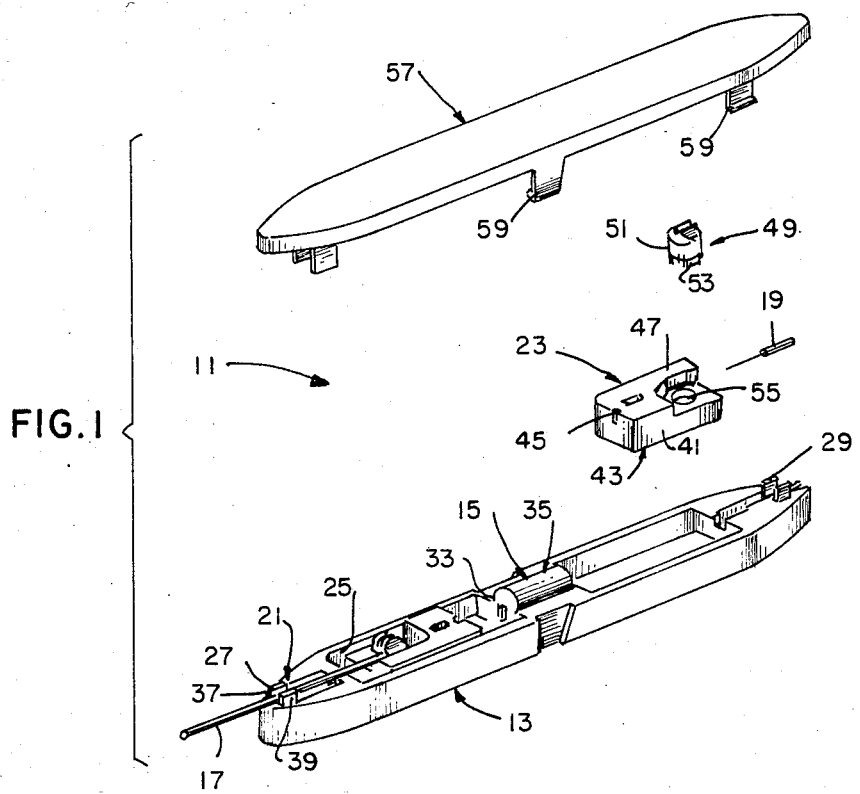
FIG. 1 is an exploded assembly view illustrating the various components of the connector.
Figure 2:
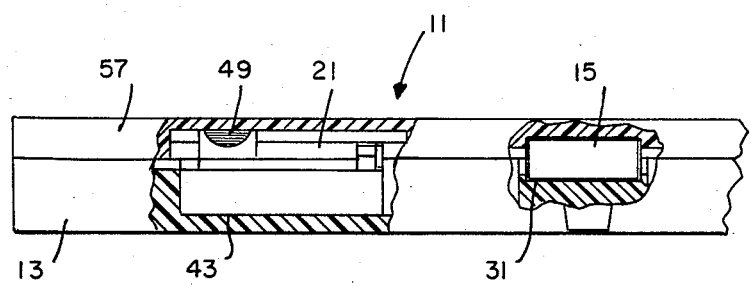
FIG. 2 is a side elevational view of the assembled connector shown partially in section.

As illustrated in detail in the drawings, the fiber optic connector 11 comprises an elongated housing 13 fixedly holding a receiving member is for positioning fibers 17, 19 in end-to-end relationship with the fibers 17, 19 projecting outwardly from opposite sides along a straight axis. Each of the fibers 17, 19 is initially inserted into and held by one of the respective slidable members 21, 23. The slidable members 21, 23 are positioned in a channel 25 for movement toward the receiving member 15 for urging respective fibers 17, 19 into engagement with the receiving member 15 to permit transmission of an optical signal. At opposite ends of the housing 13, fasteners 27, 29 are provided for securing the fiber jacket to provide strain relief.

It is contemplated that the fiber receiving member 15 may be any device for receiving or sending a fiber optic signal adapted to receive a fiber urged to engagement therewith. The drawing illustrates a preferred embodiment where fibers are joined in end-to-end relationship with a ferrule or fiber optic splice shown as the receiving member 15. The splice may be the type as illustrated and described in U.S. Pat. No. 4,257,674 to Griffin et al. In this case, the splice includes a pair of section having mating planar surfaces in engagement. One of the surfaces includes an axially aligned groove facing the other surface to form an opening. The splice comprises an elastomeric material of sufficient resilience to permit the opening to expandably receive optical fibers dimensioned larger than the opening. A sleeve is mounted about the receiving member for holding the sections in assembled relationship. As illustrated in FIG. 1, the housing 13 includes a centrally located trough 31 for positioning the axially aligned groove of the receiving member 15 on the straight axis. Partitions 33, 35 on either side of the trough 31 engage the sleeve of the receiving member 15 to prevent movement in an axial direction.

It is contemplated that the housing 13 may mate with only one side of the receiving member 15 or device. Hence, since the housing 13 on opposite sides of the receiving member 15 is substantially similar, the following description is given with respect to the housing 13 on only one side.

At the end of the housing 13 there is provided fastener 27 for engaging the outer jacket of optical fiber 17. A fastener 27 may be in the form of a pair of uprights 37, 39 which forcibly engage fiber 17 as a friction type fit. By firmly holding the outer jacket in place, external forces on the fiber 17 are absorbed by the housing.

Intermediate the fastener 27 and the trough 31 the housing 13 includes a channel 25 which is adapted to receive a slidable member 21. When positioned in the channel 25 as illustrated in FIG. 1, the slidable member 21 transverses toward and away from the receiving member 15 along the direction of the straight axis. As illustrated in the exploded view portion of FIG. 1, the slidable member 21 includes a base 41 having a flat bottom surface 43 which tracts along the corresponding flat surface of the channel 25.

The slidable member 21 includes a passageway 45 dimensioned larger than the fiber to permit the passage for fiber therethrough in alignment with the straight axis. The slidable member 21 is mounted so as to be trackable toward the receiving member 15 with the passageway 45 in alignment along the straight axis. The buffered fiber is inserted into the passageway 45 with an end projecting outwardly from the end of the slidable member 21 facing the receiving member 15.

The slidable member 21 is provided with an abutment 47 having a vertical surface spaced from the straight axis.

The camming means 49 is adapted to urge a fiber 19 against the abutment 47 and the vertical surface from a position permitting fiber movement to a position fixedly securing fiber 19 to slidable member 21. When the fiber 19 is in this latter position, the fiber 19 is adapted to be received by the receiving member 15 for transmission of optical signals by movement of the slidable member 21 toward the receiving member 15. More particularly, the camming means 49 is mounted for rotation along an axis normal to the straight axis and the camming surface 51 is spaced from the axis of rotation. As the camming means 49 is rotated from a first position with the surfaces out of engagement with the fiber 19 to a second position where the camming surface 51 is in engagement with the fiber 19, the fiber 19 is gripped. The camming means 49 includes depending flanges 53 having lateral projections which mate with a groove in a bore hole 55 in the slidable member 41.

The housing 13 is provided with a cover 57 to protect the splice from the environment. The cover 57 may be attached to the housing 13 by any convenient means such as the depending prongs 59 as shown in the drawing which engage the housing 13 as the cover 57 is properly positioned.

To assemble the connector, the receiving member 15 or ferule is positioned in the trough 31 so that movement in a direction along the straight axis is restrained. With the camming means 49 in an open position, the fiber core is threaded through the passageway 45 so that the fiber 17 projects outwardly from the end of the slidable member 21. The jacket is then removed from the end of the fiber 11 so as to expose a central core portion. The fiber 17 should project outwardly a sufficient distance so as to permit penetration of the fiber 17 into the receiving means 15 to the correct depth so as to provide good optical transmission. The camming means 49 is actuated by turning so that camming surface 51 engages a fiber 17 and urges the fiber 17 against the abutment 47. Next, the slidable member 21 is placed into the channel 25 on one side of the housing 13. Slidable member 21 is moved toward the receiving member 15 to make connection so that good optical transmission can be assured. After disengaging the cam the jacketed portion of the fiber 17 is secured to the connector housing 13 so as to protect the fiber junction region from undue stress.

While preferred embodiments of this invention have been described and illustrated, it is to be recognized that modifications and variations may be made without departing from the spirit and scope of this invention as described in the appended claims.

INDUSTRIAL APPLICABILITY

The connector for the present invention is useful for connecting optical fibers to a receiving member or device for the transmission of optical signals.

I claim:

1. Improved housing of the type for an optical fiber splice for holding the ends of a pair optical fibers in end to end relationship comprising a fiber member having an external polygonal shaped surface and formed by a pair of sections, each of said sections having a complementary and mating planar surfaces, said planar surfaces being in engagement, only one of said planar surfaces having an axially aligned groove therein and facing the other of said planar surfaces to form an opening therewith, said fiber receiving member comprising an elastomeric material of sufficient resilience to permit said opening to expandably receive optical fibers dimensioned larger than said opening, and a cylindrically shaped sleeve mounted about said opening, and a cylindrically shaped sleeve mounted about the improvement wherein said receiving member for holding said sections in assembled relationship, said housing comprising a pair of partitions forming an axially aligned trough for holding said splice in axial alignment with each of said partitions being adapted to engage opposite sides of said fiber receiving member for preventing movement of said splice in the axial direction, a pair of fasteners, each fastener being positioned at an opposite end of said housing and adapted to engage and hold one of said pair optical fibers, a pair of channels, each channel being intermediate a respective partition and said fastener, a pair of slidable members, each slidable member being associated with a respective channel and including a passageway adapted to permit straight axis for receipt thereof by said receiving member, said member including a vertically aligned abutting surface adjacent said axis and a camming means mounted for rotation along a vertically aligned axis normal to and spaced from the straight axis, said camming means having a vertically aligned engagement with a fiber is fixedly held between said abutting surface and said camming surface.

* * * * *